June 4, 1940.  A. E. JACKMAN, JR  2,203,219

CAP BOLT LOCK

Filed March 31, 1938

INVENTOR:
Arthur E. Jackman, Jr.
HIS ATTORNEYS.

Patented June 4, 1940

2,203,219

UNITED STATES PATENT OFFICE 2,203,219

CAP BOLT LOCK

Arthur E. Jackman, Jr., Canton, Ohio, assignor to The Timken Roller Bearing Company, Canton, Ohio, a corporation of Ohio Application March 31, 1938, Serial No. 199,066

4 Claims. (Cl. 151—32)

This invention relates to cap bolt locks, particularly locks for countersunk socket-head cap screws. It has for its principal objects to provide a simple, economical and efficient means for locking such screws which can be readily unlocked by forcibly turning the screw. The invention consists in the cap bolt lock and in the construction, combinations and arrangements of parts hereinafter described and claimed.

Figure 1:
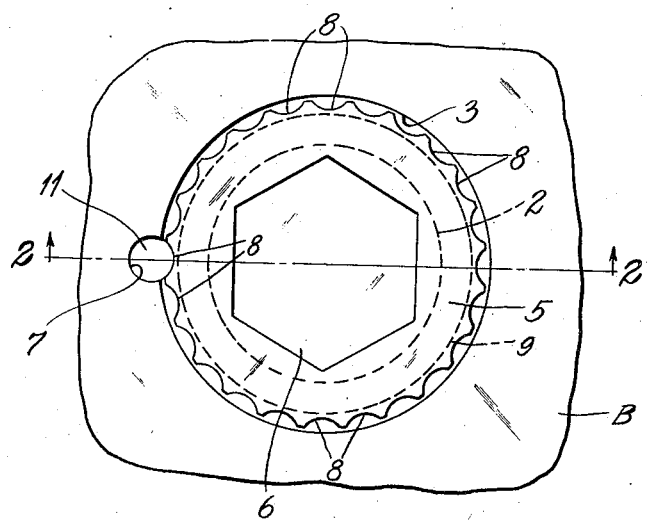
Figure 2:
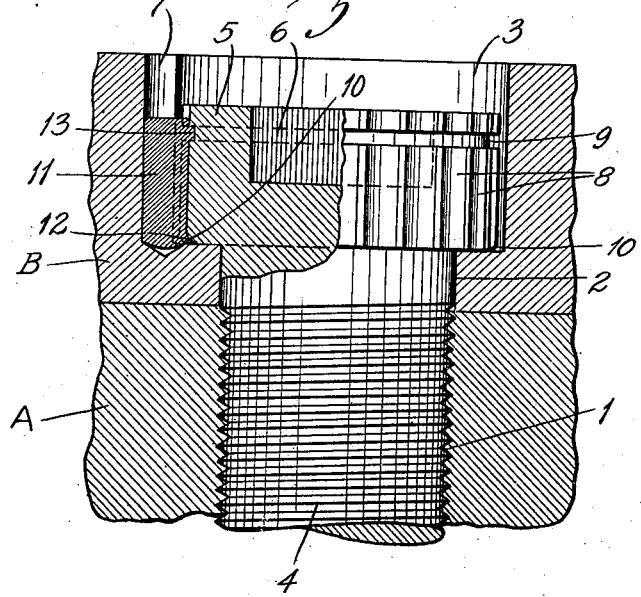

In the accompanying drawing, which forms part of this specification and wherein like symbols refer to like parts wherever they occur, Fig. 1 is a face view of a portion of a member with a socket head cap screw therethrough and provided with a locking means embodying my invention; and Fig. 2 is a section on the line 2—2 in Fig. 1, with the cap screw head shown partly in side elevation.

In the accompanying drawing, A indicates a metal member with a threaded bore 1 therethrough and B indicates a second metal member having a plain bore 2 extending therethrough with a flat bottomed enlargement or counterbore 3 at the mouth thereof. The members A and B are secured together by a cap screw or bolt having a threaded body 4, which engages the threaded bore 1 in the member A, and a cylindrical head 5, which seats in the counterbore 3 and has a flatsided socket 6 in its outer end adapted to receive a similarly shaped bar wrench (not shown) for turning said screw. The wall of the counterbore 3 has an undercut longitudinal groove 7 therein that extends from top to bottom thereof; and the head 5 of the cap screw has a serrated periphery, forming a series of circumferentially spaced longitudinally disposed peripheral grooves 8 that are interrupted near the outer end of said head by a peripheral annular groove 9. The lower or inner corner of the screw head 5 is preferably rounded, as at 10.

The above screw is prevented from working loose in the members A and B by a cylindrical locking pin 11 of soft iron or other suitable material which is driven into the undercut groove 7 in the counterbore so as to seat in said groove and in a registering peripheral groove 8 of the screw head 5. The locking pin 11 is driven home with a force sufficient to cause a portion 12 thereof to flow beneath the rounded lower corner 10 of the screw head and to cause a portion 13 of said pin to flow into the annular groove 9 in said screw head, thereby holding in position said pin against endwise movement.

When it is desired to remove the screw, the bar wrench is inserted in the socket 6 in the head 5 of the screw and the screw forcibly turned backwardly, whereby the edges of the two pin supporting grooves 7 and 8 operate as shears to separate the portion of the pin seated in the groove 8 from the portion seated in the groove 7, thereby permitting the screw to be removed. When the screw is replaced it may again be locked in position by replacing the sheared pin with a new pin driven into place in the manner hereinbefore described.

What I claim is:

1. The combination of a member having a hole with a counterbore having a longitudinal peripheral groove extending inwardly from the outer end thereof, a cap screw having a body portion extending through said hole and a countersunk cylindrical head seated in said counterbore and having a series of circumferentially spaced longitudinal peripheral grooves and a peripheral annular groove, and a pin of relatively low shearing resistance seated in said groove in said counterbore and an adjacent longitudinal peripheral groove of said head with endwise pressure sufficient to force a portion of said pin into said annular groove and adapted to be sheared by forcibly turning said screw.

2. The combination of a member having a hole with a counterbore having an undercut longitudinal groove in the side wall thereof, a sockethead cap screw having a body portion extending through said hole and a countersunk cylindrical socket head seated in said counterbore and having a rounded inner corner and a series of circumferentially spaced longitudinal peripheral grooves, and a pin of soft metal seated in said groove in said counterbore and in an adjacent longitudinal peripheral groove of said head under endwise pressure sufficient to force a portion of said pin back of the rounded corner of said head, said pin being adapted to be sheared by forcibly turning said screw.

3. The combination of a member having a hole with a counterbore having an undercut longitudinal groove in the side wall thereof, a cap screw having a body portion extending through said hole and a countersunk cylindrical socket head seated in said counterbore and having a rounded inner corner, a series of circumferentially spaced longitudinal peripheral grooves and a peripheral annular groove interrupting said circumferentially spaced grooves, and a pin of soft metal seated in the groove in said counterbore and in an adjacent longitudinal peripheral groove of said head under endwise pressure sufficient to force portions of said pin into said annular groove and back of said rounded corner, said pin being adapted to be sheared by forcibly turning said screw.

4. A cap screw comprising a body portion with a cylindrical socket head having a series of circumferentially spaced longitudinal peripheral grooves and a peripheral annular groove opening into said circumferentially spaced grooves.

ARTHUR E. JACKMAN, JR.